(12) United States Patent
Krol et al.

(10) Patent No.: US 11,260,584 B2
(45) Date of Patent: Mar. 1, 2022

(54) METHOD AND DEVICE FOR PRODUCING A THREE-DIMENSIONAL WORKPIECE

(71) Applicant: SLM Solutions Group AG, Luebeck (DE)

(72) Inventors: Toni Adam Krol, Luebeck (DE); Jan Wilkes, Luebeck (DE); Christopher Stengel, Luebeck (DE)

(73) Assignee: SLM Solutions Group AG

( * ) Notice: Subject to any disclaimer, the term of this patent is extended or adjusted under 35 U.S.C. 154(b) by 0 days.

(21) Appl. No.: 17/286,075

(22) PCT Filed: Oct. 1, 2019

(86) PCT No.: PCT/EP2019/076560
§ 371 (c)(1),
(2) Date: Apr. 16, 2021

(87) PCT Pub. No.: WO2020/078713
PCT Pub. Date: Apr. 23, 2020

(65) Prior Publication Data
US 2021/0354372 A1    Nov. 18, 2021

(30) Foreign Application Priority Data
Oct. 17, 2018    (DE) ..................... 10 2018 125 731.7

(51) Int. Cl.
*B29C 64/153*    (2017.01)
*B33Y 10/00*    (2015.01)
(Continued)

(52) U.S. Cl.
CPC .......... *B29C 64/153* (2017.08); *B29C 64/268* (2017.08); *B29C 64/286* (2017.08); *B33Y 10/00* (2014.12); *B33Y 30/00* (2014.12)

(58) Field of Classification Search
CPC ... B29C 64/153; B29C 64/286; B29C 64/268; B33Y 10/00; B33Y 30/00
See application file for complete search history.

(56) References Cited

U.S. PATENT DOCUMENTS

2006/0215246 A1    9/2006    Kerekes
2018/0036943 A1*   2/2018    Brown .................. B29C 64/268

FOREIGN PATENT DOCUMENTS

DE    10165115 B3    10/2017
EP     2333848 B1     6/2011
(Continued)

OTHER PUBLICATIONS

Römer G R B E et al.: "Electro-optic and Acousto-optic Laser Beam Scanners", Physics Procedia, Elsevier, Amsterdam, NL, Sep. 9, 2014 pp. 29-39.
(Continued)

*Primary Examiner* — Joseph S Del Sole
*Assistant Examiner* — Jamel M Nelson
(74) *Attorney, Agent, or Firm* — Williams Mullen; Thomas F. Bergert (57) ABSTRACT

The invention relates to a method for producing a three-dimensional workpiece. The method comprises irradiating a raw material layer with a laser beam, wherein a melt bath is produced at a point at which the laser beam impinges on the raw material layer, changing a position of the laser beam on the raw material layer with the aid of a first diverting unit and changing the position of the laser beam on the raw material layer with the aid of a second diverting unit. The second diverting unit is designed to divert the position of the laser beam with a greater acceleration than a maximum possible acceleration of a diversion by the first diverting unit. The invention also relates to a device for producing a three-dimensional workpiece.

4 Claims, 6 Drawing Sheets

(51) Int. Cl.
B33Y 30/00 (2015.01)
B29C 64/286 (2017.01)
B29C 64/268 (2017.01)

(56) References Cited

FOREIGN PATENT DOCUMENTS

| | | |
|---|---|---|
| EP | 2878402 A1 | 3/2015 |
| EP | 2961549 A1 | 1/2016 |
| WO | 2019141381 | 7/2019 |

OTHER PUBLICATIONS

European Patent Office, International Search Report and Written Opinion for International Application No. PCT/EP2019/076560, dated Dec. 2, 2019.
European Patent Office, International Preliminary Examination Report for International Application No. PCT/EP2019/076560, dated Oct. 13, 2020.
Search Report, German Patent and Trademark Office, Application No. DE 10 2018 125 731.7, dated May 22, 2019.
Imai, Tadayuki et al., "Fast Varifocal Lenses Based on KTa1-xNbx03 (KTN) Single Crystals", NTT Technical Review, vol. 7, No. 12, Dec. 2009.

\* cited by examiner

METHOD AND DEVICE FOR PRODUCING A THREE-DIMENSIONAL WORKPIECE

CROSS-REFERENCE TO RELATED APPLICATIONS

This application is the U.S. national phase of international application PCT/EP2019/076560, filed on Oct. 1, 2019, which claims the benefit of German application DE 10 2018 125 731.7 filed on Oct. 17, 2018; all of which are hereby incorporated herein in their entirety by reference.

The invention relates to a method and a device for producing a three-dimensional workpiece. In particular, the invention relates to a method and a device for producing a three-dimensional workpiece with the aid of a generative layer building method.

In generative methods for producing three-dimensional workpieces, and in particular in generative layer building methods, it is known to apply an initially shapeless or shape-neutral molding compound (for example a raw material powder) layer by layer to a support and to consolidate it (e.g. by fusion or sintering) by location-specific irradiation in order ultimately to obtain a workpiece of a desired shape. Irradiation can take place by means of electromagnetic radiation, for example in the form of laser radiation. In a starting state, the molding compound can initially be present in the form of granules, powder or liquid molding compound and can be selectively or, in other words, location-specifically consolidated as a result of the irradiation. The molding compound can comprise, for example, ceramics, metal or plastics materials and also material mixtures thereof. A variant of generative layer building methods relates to so-called powder bed laser beam melting, in which in particular metallic and/or ceramics raw material powder materials are consolidated to three-dimensional workpieces.

In order to produce individual workpiece layers it is further known to apply raw material powder material in the form of a raw material powder layer to a support and to irradiate it selectively and in accordance with the geometry of the workpiece layer that is currently to be produced. The laser radiation penetrates the raw material powder material and consolidates it, for example as a result of heating, which causes fusion or sintering. Once a workpiece layer is consolidated, a new layer of unprocessed raw material powder material is applied to the workpiece layer which has already been produced. Known coater arrangements or powder application devices can be used for this purpose. Irradiation is then again carried out on the raw material powder layer which is now uppermost and is as yet unprocessed. Consequently, the workpiece is gradually built up layer by layer, each layer defining a cross-sectional area and/or a contour of the workpiece. It is further known in this connection to use CAD or comparable workpiece data in order to produce the workpieces substantially automatically.

An irradiation unit, or an irradiation system, which can be used, for example, in a device for producing three-dimensional workpieces by irradiation of raw material powder materials is described in EP 2 333 848 B1. The irradiation system comprises a radiation source, in particular a laser source, and an optical unit. The optical unit, to which a processing beam emitted by the radiation source is provided, comprises a beam widening unit and a deflection device in the form of a scanner unit (or scan unit).

It will be appreciated that all the aspects discussed above can likewise be provided within the scope of the present invention.

Known devices for producing three-dimensional workpieces are to be found, for example, in EP 2 961 549 A1 and in EP 2 878 402 A1.

As build volumes (in particular build cylinders) increase in size, and as part of the associated possibility of producing larger workpieces, the corresponding building processes last increasingly longer. In particular in this connection, it is desirable to increase the process productivity. More specifically, it is desirable to consolidate as large an area of raw material as possible, or as large a volume of raw material as possible, in as short a time as possible, in order to shorten an overall process time. However, the quality of the workpiece that is produced is if possible not to suffer from a shortening of the process time.

One possibility for increasing the process productivity consists in providing multiple radiation sources, so that multiple beams can simultaneously be directed onto the raw material. A possibility similar thereto consists in splitting an incident laser beam into multiple sub-beams and guiding those sub-beams over the raw material either together or individually under the control of one or more scanner units.

The above possibilities are, however, comparatively expensive, require a large amount of space and/or expensive or complex optical components.

Accordingly, the object of the invention is to provide a solution for a generative layer building method which reduces or overcomes the problems mentioned above and other related problems.

This object is achieved by a method having the features of patent claim 1 and a device having the features of patent claim 6.

Accordingly, the invention relates according to a first aspect to a method for producing a three-dimensional workpiece. The method comprises irradiating a raw material layer with a laser beam, wherein a melt pool is produced at a point at which the laser beam strikes the raw material layer, changing a position of the laser beam on the raw material layer with the aid of a first deflection unit, and changing the position of the laser beam on the raw material layer with the aid of a second deflection unit. The second deflection unit is adapted to deflect the position of the laser beam with a greater acceleration than a maximum possible acceleration of a deflection by the first deflection unit.

The laser beam can be generated by a laser conventionally used for beam melting techniques. For example, a Nd:YAG laser, which generates a laser beam with a wavelength of 1064 nm, can be used. The raw material layer can be an uppermost layer of raw material which has previously been applied layer by layer to a support. The raw material can be present in the form of, for example, powder or granules and comprise, for example, metal, ceramics and/or plastics material. The term "melt pool" is used throughout the present disclosure as an umbrella term for a region of the raw material layer which, under the effect of the laser beam, is heated for a short time in such a manner that the raw material in that region is able to consolidate (for example by fusion or sintering). Accordingly, the "melt pool" according to the present disclosure can also be, for example in the case of selective laser sintering, a sintered region. The first deflection unit and the second deflection unit can both be arranged one behind the other in the beam path of the laser beam. The second deflection unit can be arranged in the beam path before or after the first deflection unit. The first deflection unit and the second deflection unit can be actuated independently of one another by a control unit. The first deflection unit can, for example, be adapted to move the laser beam over the raw material layer in two dimensions (x-direction and y-direction). Furthermore, the second deflection unit can be suitable for deflecting the laser beam in one or two directions (for example in the x-direction and y-direction with respect to the raw material layer). There can additionally be provided a focusing unit which is able to change and adapt a focus position in the z-direction of the laser beam. Changing the position of the laser beam on the raw material layer can accordingly generally mean that the position of the laser beam is changed within a plane of the raw material layer (i.e. within the x-y plane).

Independently thereof, a change of the focus position (in the z-direction) can additionally be carried out.

The fact that the second deflection unit is adapted to deflect the position of the laser beam with a greater acceleration than a maximum possible acceleration of a deflection by the first deflection unit describes structural physical properties of the first and the second deflection unit. In other words, the second deflection unit, owing to its configuration, is capable of deflecting the laser beam with a greater acceleration than the first deflection unit. The acceleration can in particular be an acceleration starting from a rest position of the position of the laser beam, that is to say directly after the laser beam is moved from a rest position. A galvanometer mirror has a certain inertia (in particular starting from a rest position of the mirror) compared to an electro-optic deflector, for example, so that a galvanometer mirror is not capable of carrying out a deflection with the same high acceleration as an electro-optic deflector.

In one example, the first deflection unit comprises a scan unit having at least one movable mirror and the second deflection unit comprises an electrooptic deflector. An example of an alternative second deflection unit comprises, for example, at least one acousto-optic deflector. Furthermore, a scan unit having movable mirrors (for example galvanometer mirrors) can be used both for the first deflection unit and for the second deflection unit, for example, wherein the mirrors of the second deflection unit make possible a movement, or deflection, of the laser beam with a higher acceleration than the mirrors of the first deflection unit.

By the combination of the first deflection unit and the second deflection unit, scan vectors which would not be possible with the first deflection unit alone can be achieved. For example, a temporal and spatial profile of one or more melt pools can be achieved, which would not be possible by means of a single first deflection unit. A workpiece can accordingly be produced more rapidly and optionally more precisely.

The change of position by the first deflection unit can be carried out with a lower acceleration and/or with a lower speed than the change of position by the second deflection unit.

In other words, the component of the second deflection unit and the component of the first deflection unit in an overall movement of the laser beam can be logically separated from one another. The component of the second deflection unit causes a quicker movement and/or a higher acceleration. This can be made possible as a result of the fact that the second deflection unit can be switched considerably more quickly than the first deflection unit (which is prevented from moving quickly or accelerating quickly, for example, by the inertia of the mechanical movement of mirrors). In one example, the second deflection unit can therefore be switched more quickly since, unlike the first deflection unit, it does not have any mechanically movable components (in particular mirrors). In the case of the first deflection unit, the mass inertia of the movable mass of the mechanically movable components can result in the movement being subject to a certain delay. The maximum current of the power supply used thereby limits the acceleration.

The first deflection unit can comprise a scan unit which comprises at least one movable mirror, and the second deflection unit can comprise an electro-optic deflector.

In other words, the feature that the second deflection unit is adapted to deflect the position of the laser beam with a greater acceleration than a maximum possible acceleration of a deflection by the first deflection unit can be provided and realized in a concrete case in that the first deflection unit comprises a scan unit which comprises at least one movable mirror, and the second deflection unit comprises an electro-optic deflector.

The first deflection unit can comprise, for example, at least two movable mirrors, so that the laser beam can be moved over the raw material layer in two dimensions (x-direction and y-direction) with the aid of the first deflection unit. Furthermore, the second deflection unit can comprise one or more electro-optic crystals. In this case, the second deflection unit can be so configured that the refractive index within the one or more electro-optic crystals can be changed along one or two axes by the application of one or two electric fields. The second deflection unit can accordingly be suitable for deflecting the laser beam in one or two directions (for example in the x-direction and y-direction with respect to the raw material layer). The second deflection unit can comprise, for example, two electro-optic crystals arranged one behind the other, wherein one of the two crystals is adapted to deflect the beam in a first direction substantially perpendicular to the beam propagation direction (e.g. x-direction) and wherein the other of the two crystals is adapted to deflect the beam in a second direction substantially perpendicular to the beam propagation direction (e.g. y-direction), wherein the second direction is substantially perpendicular to the first direction. The electro-optic deflector, in addition to the possibility of deflecting the laser beam in the x-direction and in the y-direction, can be suitable for changing a focus position of the laser beam in the z-direction.

The change of position with the aid of the first deflection unit can effect an advance of the laser beam in a first direction, and the change of position with the aid of the second deflection unit can take place in a second direction which is different from the first direction.

It is thereby possible, for example, that the first deflection unit provides for a linear advance (section by section), while the second deflection unit brings about smaller movements, or smaller deflections, of the laser beam which differ from the linear (without the deflections of the second deflection unit) course of the first deflection unit.

The method can further comprise producing at least a first melt pool and a second melt pool, wherein the laser beam is moved to and fro between the first melt pool and the second melt pool by the change of position with the aid of the second deflection unit, and wherein the first melt pool and the second melt pool are moved over the raw material layer by the change of position with the aid of the first deflection unit.

The to and fro movement between the at least two melt pools can thereby take place with a significantly higher acceleration (for example greater than a factor of 10, a factor of 100 or a factor of 1000) than the movement (i.e. in particular the acceleration) of the melt pools by the first deflection unit. That the melt pools are moved over the raw material layer can mean in the present disclosure that the laser beam which is responsible for producing the melt pools is moved in such a manner that at least two temporally continuous melt pools are maintained, the position of which changes. In other words, the laser beam can jump to and fro between two or more melt pools with the aid of the second deflection unit and accordingly maintain those melt pools.

The laser beam, by the change of position with the aid of the second deflection unit, can be moved to and fro between the first and the second melt pool in such a manner that the laser beam does not produce a melt pool between the first melt pool and the second melt pool.

Regions of the raw material over which the laser beam passes during the to and fro movement can accordingly, for example, not be melted (since, owing to the rapid movement by the second deflection unit, sufficient energy to melt the raw material is not irradiated, i.e. the laser beam is moved too quickly). In other words, between the active melt pools there are regions of the raw material layer in which there is no melt pool.

During the change of position with the aid of the second deflection unit, a melt pool can continuously be produced at the current position of the laser beam. The change of position with the aid of the second deflection unit can accordingly also take place sufficiently slowly that, during this change, a melt pool is produced at the respective current position of the laser beam.

The method can further comprise producing a melt pool during a change of position with the aid of the first deflection unit and/or with the aid of the second deflection unit from a first starting point to a first end point, changing the position of the laser beam from the first end point to a second starting point with the aid of the second deflection unit, wherein a melt pool is not produced during this change of position, and producing a melt pool during a change of position with the aid of the first deflection unit and/or with the aid of the second deflection unit from the second starting point to a second end point.

That a melt pool is not produced during the change of position from the first end point to the second starting point can mean, for example, that a melt pool is not produced at that time at the current position of the laser beam. The laser beam can accordingly be moved from a first melt pool to a second melt pool, or from a first scan vector to a second scan vector, without having to be switched off (for example using a shutter).

The method can further comprise changing the position of the laser beam with the aid of the second deflection unit in accordance with a predetermined closed line pattern which is repeated several times, and moving the line pattern over the raw material layer in a predetermined direction with the aid of the first deflection unit.

The closed line pattern can accordingly carry out a wobble movement, which is superposed on the movement caused by the scanner unit. Accordingly, a current size of a melt pool can be increased, for example. That the line pattern is moved over the raw material layer means, in other words, that the laser beam is moved over the raw material layer in such a manner that the closed line pattern does not remain in situ but is moved over the raw material layer. The closed line pattern is accordingly closed inasmuch as it represents a closed pattern in the absence of movement of the first deflection unit (or with respect to a coordinate system which moves with the movement of the first deflection unit).

The closed line pattern can comprise one of the following patterns: a circle, an ellipse, a straight line, an eight. The straight line thereby corresponds to a to and fro movement in one dimension.

The method can further comprise actuating the second deflection unit in order to compensate for a tracking error of the first deflection unit. A tracking error of the first deflection unit can mean that an actual position of the laser beam caused by a deflection of the first deflection unit differs from a target position. The target position can thereby be specified by a control unit by corresponding control signals. The tracking error can be caused in particular by a mass inertia of mirrors (in particular galvanometer mirrors) of the first deflection unit. Compensation for the tracking error by the second deflection unit can be achieved in that the second deflection unit carries out a deflection of the laser beam which leads to the combination, or superposition, of the deflections by the first deflection unit and the second deflection unit resulting in a position of the laser beam which corresponds to a target position.

The method described above for compensating for the tracking error can have the advantage that delays, which are known from the prior art, can be omitted or reduced, since the actuation of the second deflection unit can be carried out simultaneously with a movement of the first deflection unit.

The method can further comprise: a) actuating the first deflection unit to carry out a deflection of the laser beam in a first direction; b) actuation of the first deflection unit to carry out a deflection of the laser beam in a second direction which is different from the first direction; and c) simultaneously with step b): actuating the second deflection unit to carry out a compensating deflection in order to compensate for a tracking error of the first deflection unit.

The first direction can thereby correspond to a linear direction parallel to an uppermost raw material layer (e.g. y-direction). The second direction can correspond, for example, to a direction running perpendicularly to the first direction parallel to the uppermost raw material layer (e.g. x-direction).

The invention relates according to a second aspect to a device for producing a three-dimensional workpiece. The device comprises a support for receiving at least one raw material layer, an irradiation unit for irradiating the raw material layer with a laser beam so that a melt pool is produced at a point at which the laser beam strikes the raw material layer, a first deflection unit for changing a position of the laser beam on the raw material layer, a second deflection unit for changing the position of the laser beam on the raw material layer, and a control unit for controlling at least the first deflection unit and the second deflection unit. The second deflection unit is adapted to deflect the position of the laser beam with a greater acceleration than a maximum possible acceleration of a deflection by the first deflection unit.

All the details discussed above in relation to the method of the first aspect can also apply to or be used in the device of the second aspect.

The control unit can be adapted to control the first deflection unit and the second deflection unit in such a manner that the change of position by the first deflection unit is carried out with a lower acceleration and/or with a lower speed than the change of position by the second deflection unit.

The first deflection unit can comprise a scan unit which comprises at least one movable mirror, and the second deflection unit can comprise an electro-optic deflector.

The control unit can be adapted to control the first deflection unit and the second deflection unit in such a manner that the change of position with the aid of the first deflection unit effects an advance of the laser beam in a first direction, and that the change of position with the aid of the second deflection unit takes place in a second direction which is different from the first direction.

The control unit can be adapted to control the first deflection unit and the second deflection unit in such a manner that at least a first melt pool and a second melt pool are produced, wherein the laser beam is moved to and fro between the first melt pool and the second melt pool by the change of position with the aid of the second deflection unit, and wherein the first melt pool and the second melt pool are moved over the raw material layer by the change of position with the aid of the first deflection unit.

Actuation of the first deflection unit and of the second deflection unit to produce or not produce a melt pool can take place in such a manner that the laser beam remains significantly longer, or is moved significantly more slowly, at a location at which a melt pool is to be produced than at a location at which a melt pool is not to be produced (speed, for example, greater than a factor of 10, a factor of 100 or a factor of 1000). It can thereby be assumed that the person skilled in the art can set corresponding temporal sequences without difficulty on the basis of the properties of the laser used, or of the raw material used.

The control unit can be adapted to control the first deflection unit and the second deflection unit in such a manner that the laser beam, by the change of position with the aid of the second deflection unit, is moved to and fro between the first and the second melt pool in such a manner that the laser beam does not produce a melt pool between the first melt pool and the second melt pool.

The control unit can be adapted to control the first deflection unit and the second deflection unit to produce a melt pool during a change of position with the aid of the first deflection unit and/or with the aid of the second deflection unit from a first starting point to a first end point, to change the position of the laser beam from the first end point to a second starting point with the aid of the second deflection unit, wherein a melt pool is not produced during this change of position, and to produce a melt pool during a change of position with the aid of the first deflection unit and/or with the aid of the second deflection unit from the second starting point to a second end point.

The control unit can be adapted to control the first deflection unit and the second deflection unit to change the position of the laser beam with the aid of the second deflection unit in accordance with a predetermined closed line pattern which is repeated several times, and to move the line pattern over the raw material layer in a predetermined direction with the aid of the first deflection unit.

The closed line pattern can comprise one of the following patterns: a circle, an ellipse, a straight line, an eight.

The control unit can be adapted to actuate the second deflection unit to compensate for a tracking error of the first deflection unit.

The control unit can further be adapted to: a) actuate the first deflection unit to carry out a deflection of the laser beam in a first direction; b) actuate the first deflection unit to carry out a deflection of the laser beam in a second direction which is different from the first direction; and c) simultaneously with step b): actuate the second deflection unit to carry out a compensating deflection in order to compensate for a tracking error of the first deflection unit.

The invention will be explained hereinbelow with reference to the accompanying figures, in which.

Figure 1:
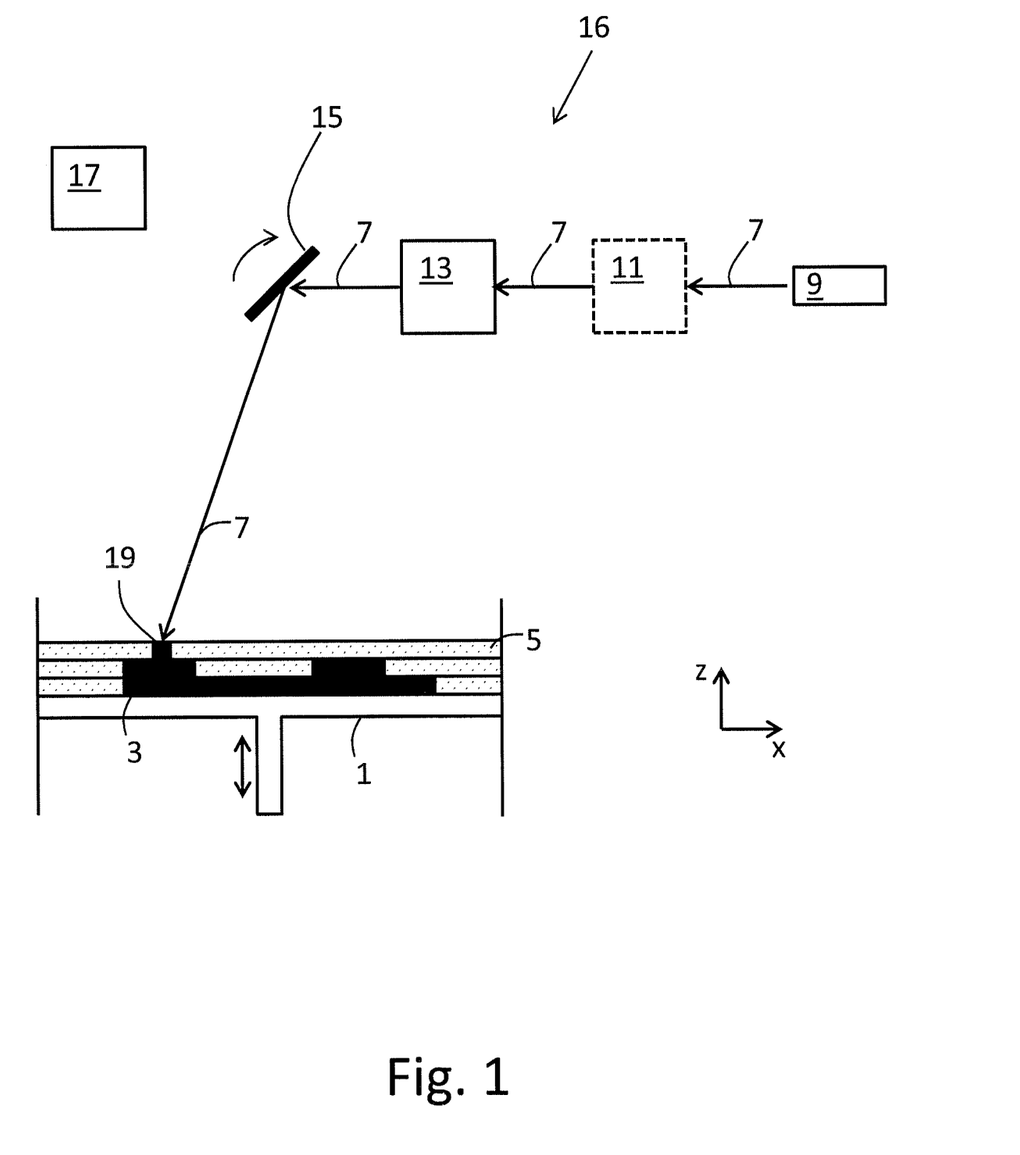
FIG. 1: is a schematic side view of a device according to the invention which carries out a method according to the invention.

FIG. 1 shows an exemplary embodiment of a device according to the invention in a schematic side view. The views of the figures are not necessarily true to scale. A vertical direction is defined in FIG. 1 by the z-direction and a horizontal plane (also x-y plane hereinbelow) extends perpendicularly to the plane of the drawing along a support 1 of the device.

Within the scope of a process for producing a workpiece 3, a first layer 5 of raw material (for example raw material powder) is first applied to the support 1 by a raw material application device (for example a powder application device, not shown). This first raw material layer 5, and following raw material layers 5, extend along the x-y plane. After the first raw material layer 5 has been applied, this (uppermost) layer 5 is selectively irradiated by a laser beam 7 in such a manner that the raw material bonds together at the irradiated points and is accordingly consolidated. This can take place by fusion or sintering, for example. At a location at which the laser beam 7 irradiates the raw material for a sufficiently long time, a melt pool, in which the raw material is fused or sintered, accordingly forms.

After the desired regions of the raw material layer 5 in question have been successfully irradiated and consolidated, the support 1 is moved downwards and a subsequent raw material layer 5 is applied to the previous raw material layer 5 and again selectively consolidated. The above steps are repeated, and the workpiece 3 can accordingly be built up layer by layer.

The device comprises a laser beam source 9, which is suitable for generating the laser beam 7 with a suitable wavelength and energy to consolidate the raw material used. After it has been generated by the laser beam source 9, the laser beam 7 passes through an optional focusing unit 11. With the aid of the focusing unit 11, a focus position of the laser beam 7 along the beam axis (i.e. substantially in the z-direction) can be changed in known manner. The focusing unit 11 is optional inasmuch as it can also be omitted or integrated into the scan unit 15 described hereinbelow or into the electro-optic deflector 13 described hereinbelow.

In the beam path of the laser beam 7, downstream of the focusing unit 11, there is arranged an electro-optic deflector 13, through which the laser beam 7 passes. The electro-optic deflector 13 is adapted to deflect the laser beam 7 in at least one dimension (i.e. in at least one direction) in dependence on a control signal (from the control unit 17 described hereinbelow). For that purpose, the electro-optic deflector 13 has at least one electro-optic crystal (or optic crystal). The electro-optic crystal can consist, for example, of KTN (potassium tantalum niobate). A particular advantage of the use of KTN is a comparatively large change of the refractive index when a voltage is applied to the crystal. Other materials such as, for example, lithium niobate (LN) or barium titanate (BT) are likewise conceivable.

The basic principle of the electro-optic deflector 13 is known to the person skilled in the art. The beam deflection in the optic crystal of the beam deflector 13 is based on a change in the refractive index n when an electric field is applied as a result of the non-linear Kerr effect, which is dependent on the square of the electric field strength and accordingly the electrical voltage applied to the optic crystal. For details see, for example, Thorsten Ledig, Peter Bechtold: "Schnelle Laserscans mithilfe von KTN-Kristallen", wherein the principles described therein of an electro-optic deflector can be applied to the electro-optic deflector 13 of the present disclosure.

Accordingly, the laser beam 7 can be deflected in at least one direction (perpendicular to the beam axis of the laser beam 7) by applying a voltage to electrodes of the electro-optic deflector 13. The deflection angle is thereby dependent on the level of the applied voltage. After the laser beam 7 has been deflected by the scan unit 15, which is described hereinbelow, the deflection of the electro-optic deflector 13 leads to a deflection of the laser beam 7 in at least one direction of the x-y plane, that is to say in the plane of the uppermost raw material layer 5.

In order to ensure deflectability in two dimensions (i.e. both in the x-direction and in the y-direction), the electro-optic deflector 13 can comprise two optic crystals arranged one behind the other (a first optic crystal and a second optic crystal), wherein the electric field generated in the first optic crystal is perpendicular to the beam axis of the laser beam 7. The electric field generated in the second optic crystal is likewise perpendicular to the beam axis of the laser beam 7 and perpendicular to the electric field of the first optic crystal. In other words, corresponding electrodes can be provided for generating the electric fields described above, which are rotated through 90° relative to one another. As a result of the arrangement described above, a deflection in a first direction (for example x-direction of the plane of the raw material layer 5) can be ensured by the first optic crystal, for example, and a deflection in a second direction perpendicular thereto (for example y-direction of the plane of the raw material layer 5) can be ensured by the second optic crystal.

With corresponding actuation by a control unit 17 described hereinbelow, a position of the laser beam 7 on the raw material layer 5 can accordingly be specified and adapted. An advantage of the use of an electro-optic deflector 13 (for example compared to an electro-acoustic deflector or compared to the scan unit 15) is that a switching time of the electro-optic deflector 13 is very short and the position of the laser beam 7 can accordingly be changed very quickly (optionally without producing a melt pool).

In addition to changing the position of the laser beam 7 in the x-y plane, a change of the focus position along the beam axis of the laser beam 7 can optionally also be carried out by the electro-optic deflector 13 if an electro-optic crystal having a corresponding electrode arrangement is provided, see, for example, Tadayuki Imai, Shogo Yagi, Seiji Toyoda, Masahiro Sasaura: "Fast Varifocal Lenses Based on KTa1-xNbx03 (KTN) Single Crystals". In this manner, a focusing unit, for example, can be integrated into the electro-optic deflector 13.

The device further comprises a scan unit 15 which is arranged in the beam path of the laser beam 7 after the electro-optic deflector 13. The scan unit 15 comprises in conventional manner at least one movable mirror with the aid of which the position of the laser beam 7 on the uppermost raw material layer 5 (i.e. in the x-y plane) can be changed. Preferably at least two movable mirrors are provided or a movable mirror is movable in at least two directions (or rotatable about at least two crossed axes), so that the laser beam 7 can be moved both in the x-direction and in the y-direction. The change of position of the laser beam 7 in the x-y plane caused by the scan unit 15 takes place, owing to the mechanical inertia of the mirror or mirrors of the scan unit 15, significantly more slowly than a quickest possible change in position with the aid of the electro-optic deflector 13. It is, however, possible to reach a larger region of the surface of the uppermost raw material layer 5 with the scan unit 15 than with only the electro-optic deflector 13. In other words, larger deflection angles of the laser beam 7 can be achieved with the scan unit 15 than with the electro-optic deflector 13.

A combination of the electro-optic deflector 13 and the scan unit 15 can accordingly have the advantage that rapid deflections of the laser beam 7 are possible without having to make compromises in terms of the reachable surface of the raw material layer 5.

The arrangement of the scan unit 15 and the electro-optic deflector 13 can, however, also be reversed, so that the electro-optic deflector 13 is arranged in the beam path after the scan unit 15. The above-described elements focusing unit 11, electro-optic deflector 13 and scan unit 15 are part of an irradiation unit 16.

The device further comprises a control unit 17. The control unit 17 is adapted to control at least the functions (i.e. the movement sequences) of the electro-optic deflector 13 and of the scan unit 15. The control unit 17 can further serve to control the laser beam source 9, the focusing unit 11, the movable support 1 and the raw material application device. The control unit 17 can accordingly be a general control unit of the device. The control unit 17 comprises a processor and a memory. On the memory there are stored commands which prompt the processor to carry out at least one method according to the present disclosure. The commands can be stored, for example, in the form of a program or program sequence. More specifically, the commands prompt the processor to actuate at least the electro-optic deflector 13 and the scan unit 15 in accordance with a predetermined sequence. Examples of this predetermined sequence, or of the resulting method, will be described in connection with the following figures.

Figure 2:
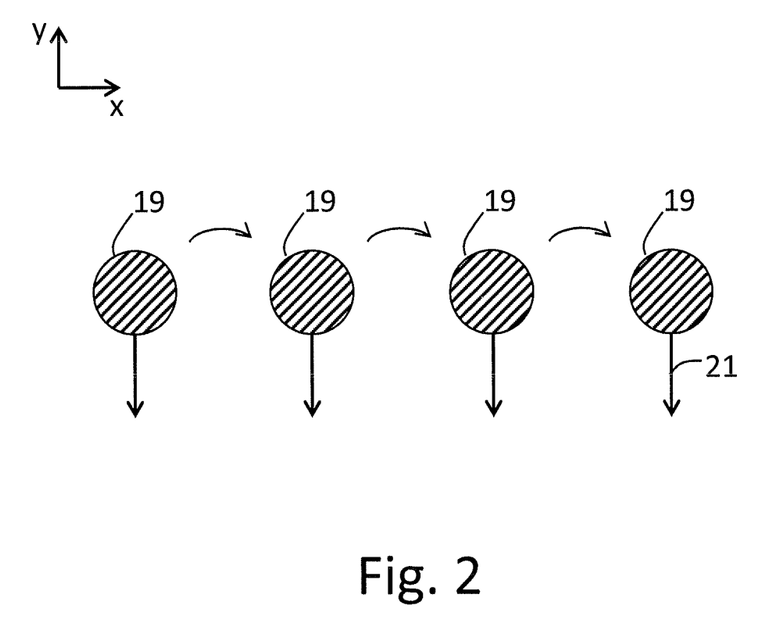
FIG. 2: is a schematic top view to show a method in which the laser beam jumps to and fro between multiple melt pools with the aid of the second deflection unit.

FIG. 2 shows a method in which multiple melt pools can be kept "open", or active. In other words, "quasi-beam splitting" of the laser beam 7 takes place by means of the electro-optic deflector 13. In FIG. 2, four melt pools 19 are shown next to one another (in the x-direction). A movement, or a change of position, of the laser beam 7 on the raw material layer 5 with the aid of the electro-optic deflector 13 and of the scan unit 15 takes place as follows. The scan unit 15 provides for a linear advance 21, for example in the Y-direction, as is shown in FIG. 2. However, the advance 21 does not necessarily have to be linear but can also follow any desired other path. During the advance 21 in the y-direction with the aid of the scan unit 15, the electro-optic deflector 13 carries out a significantly more rapid change of position of the laser beam 7 from one melt pool 19 to the other melt pool 19. For example, the laser beam 7 can jump within approximately 1 µs from the melt pool 19 on the far left to the second melt pool 19 from the left (see FIG. 2), where the laser beam 7 then remains (or is moved slowly by the scan unit 15) for a period of time which is significantly longer than the time required for the jump (for example greater than a factor of 10, factor of 100 or factor of 1000). The laser beam 7 is then moved within approximately 1 µs with the aid of the electro-optic deflector 13 from the second melt pool 19 to the third melt pool 19, where it again remains for a certain period of time. This operation is repeated up to the last (right-hand) melt pool, from where the laser beam 7 can then jump back again either to the first melt pool 19 or to the third melt pool 19.

It can be ensured by means of the method described above that multiple melt pools 19 (in the example of FIG. 2 four melt pools) can be maintained simultaneously, that is to say that the raw material in the region of the melt pools 19 is temporally continuously in a molten state. Accordingly, by using a single laser beam source 9 and without actually splitting the laser beam 7, a quasi-splitting of the laser beam 7 can be achieved, so that multiple melt pools 19 can simultaneously be produced and moved in the raw material layer 5.

For the method described above, a movement in only one direction (x-direction) is sufficient, wherein the melt pools 19 can, however, be in any desired arrangement (for example also in two dimensions, for example in the form of a rectangle or a rhombus). Furthermore, individual melt pools 19 can be added in or deactivated during the building process. A change of the arrangement of the melt pools 19 (for example a change of their respective distances from one another) is also possible during the build process.

The number and/or arrangement of the melt pools 19 can, for example, be so controlled during a building process that an inner core region of the workpiece is processed rapidly (e.g. with multiple melt pools 19 maintained simultaneously) and an outer envelope region is processed more slowly and with greater precision (e.g. as a result of the fact that only one melt pool 19 is used).

In the manner described above, a large area of the raw material layer can effectively be consolidated in a short time, wherein it is possible to react flexibly to changes in the shape to be consolidated.

Figure 3:
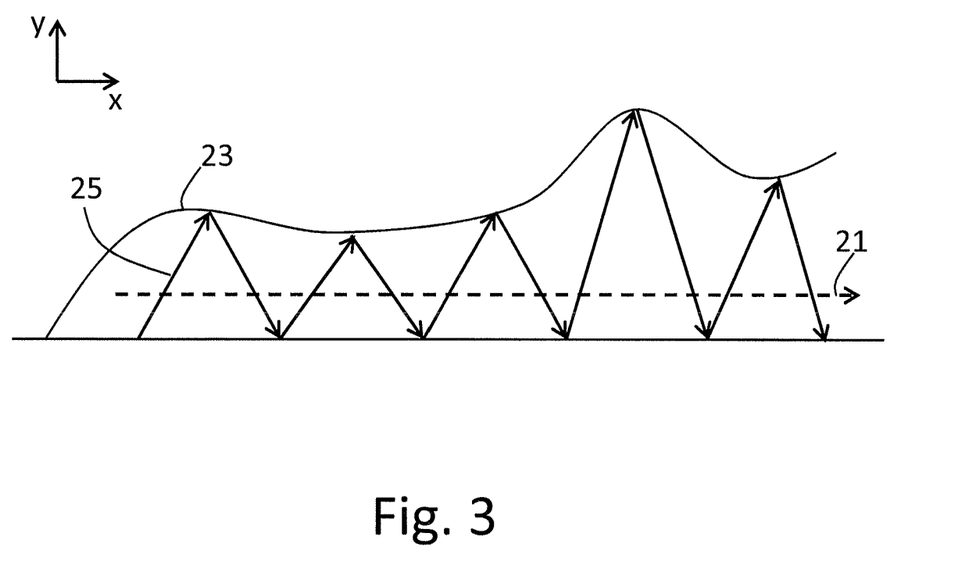
FIG. 3: is a schematic top view to show a method in which the laser beam is deflected only in one direction with the aid of the second deflection unit.

FIG. 3 shows a further method according to the present disclosure, with the aid of which a contour 23 of a workpiece 3 can be formed precisely. According to the method of FIG. 3, the scan unit 15 provides for a linear advance 21 in the x-direction. This advance 21 caused by the scan unit 15 does not have to be linear, however, but can assume any desired shape. At the same time, the laser beam 7, deflected by the electro-optic deflector 13, carries out a to and fro movement in the direction of the y-axis, which, in combination with the advance 21 of the scan unit 15, results in a zigzag movement 25 of the laser beam 7 on the raw material layer 5.

The overall movement of the laser beam 7 takes place sufficiently slowly that a melt pool 19 is maintained temporally continuously.

Figure 4:
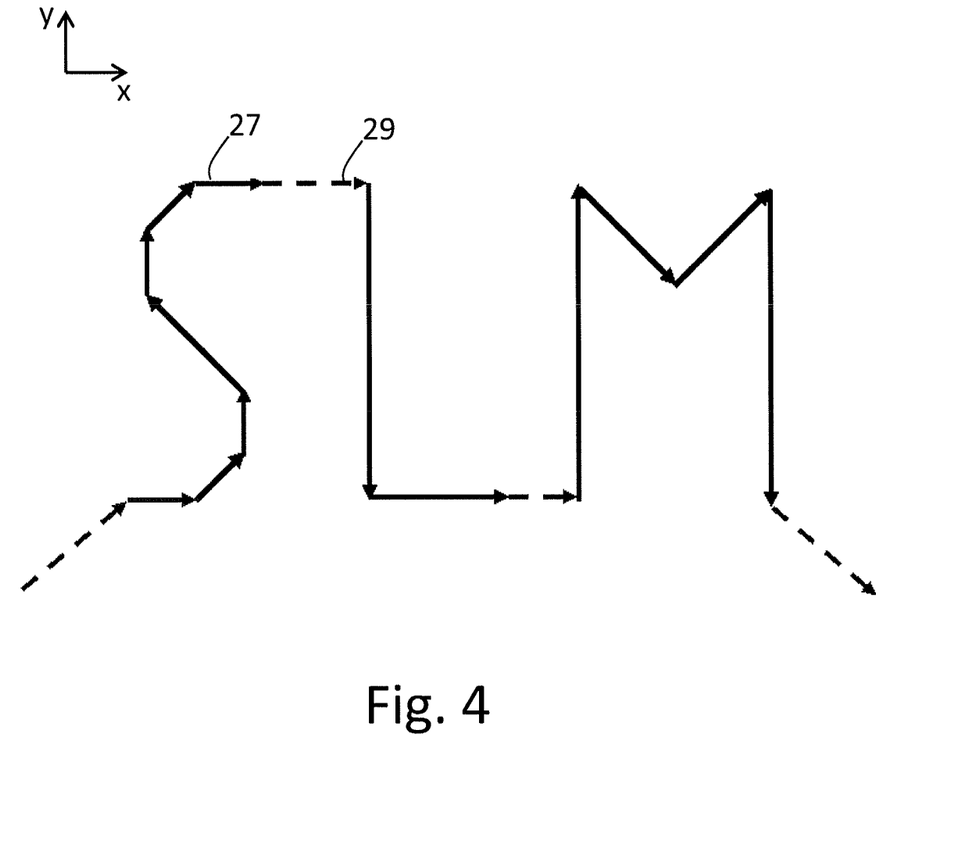
FIG. 4: is a schematic top view to show a method in which the laser beam jumps from a first scan vector to a second scan vector with the aid of the second deflection unit without producing a melt pool.

FIG. 4 shows a possible way in which a complex line pattern with breaks can be consolidated without the laser beam source 9 having to be shut off (for example by means of a shutter). The continuous portions 27 are thereby so irradiated that a movement of the laser beam 7 over those portions 27 takes place sufficiently slowly that a melt pool 19 is maintained and accordingly a continuous line is consolidated.

On the other hand, the portions 29 depicted by broken lines are passed over so quickly with the aid of the electro-optic deflector 13 that a melt pool is not produced in those regions. The method can be carried out, for example, in such a manner that the movement of the laser beam 7 over the portions 27 is carried out with the aid of the scan unit 15 and/or with the aid of the electro-optic deflector 13. The movement over the portions 29 is, however, carried out with the aid of the electro-optic deflector 13, since the electro-optic deflector permits a correspondingly rapid deflection and in particular a deflection with high acceleration, so that the deflection over those portions 29 can be carried out in a short time. Accordingly, a melt pool 19 is produced in the portions 27 in each case from a starting point to an end point and then the laser beam jumps to a further starting point without producing a melt pool, starting from which a melt pool is again produced.

Figure 5:
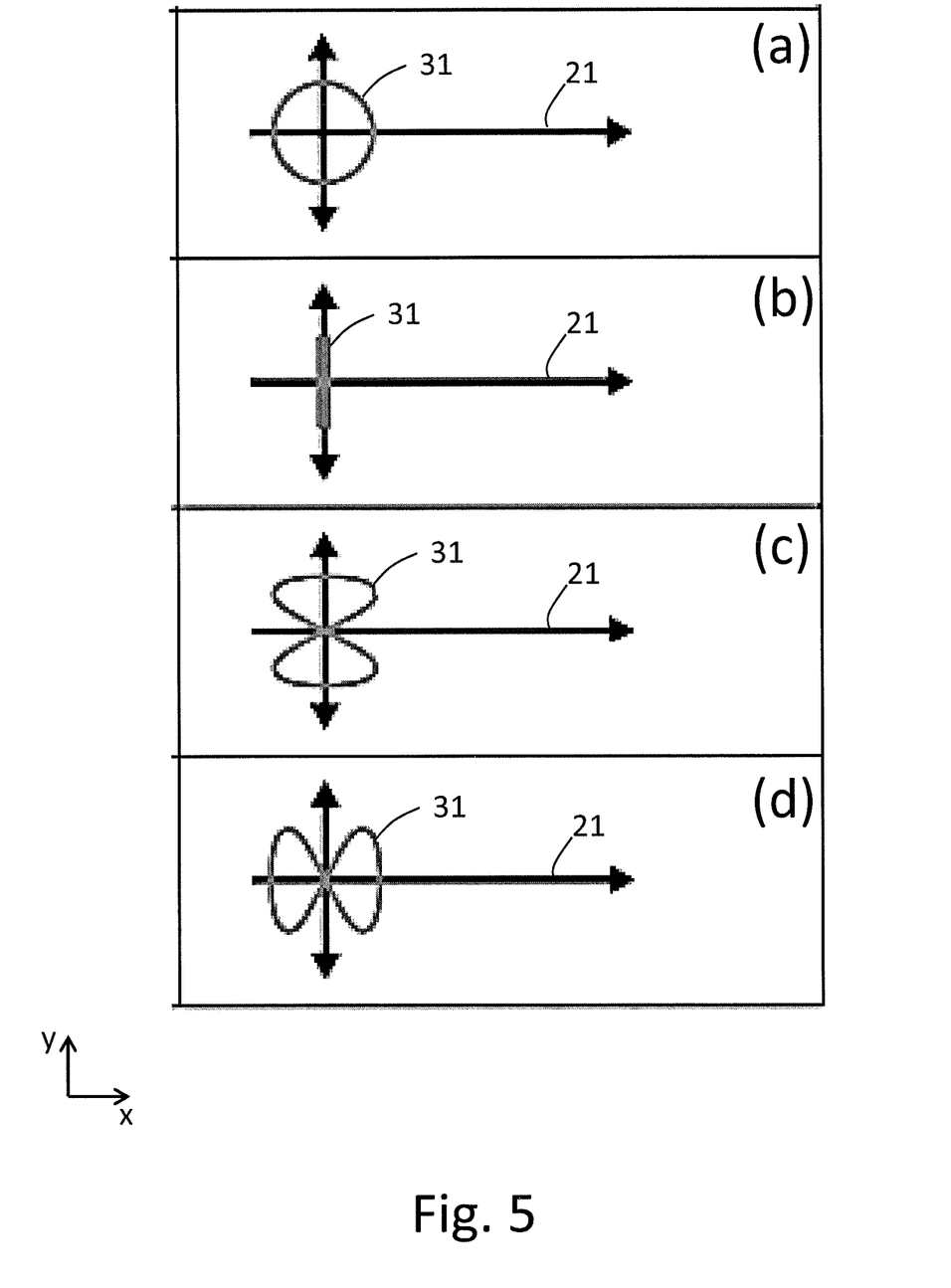
FIG. 5: is a schematic top view to show four different exemplary methods, wherein the laser beam travels along a closed line shape (wobbling) with the aid of the second deflection unit and is moved linearly with the aid of the first deflection unit.

FIG. 5 shows in sections (a) to (d) four exemplary possibilities of how an effective diameter of the laser beam 7 can be increased, or how a consolidated area of raw material can be increased, by wobbling. The scan unit 15 thereby again carries out an advance 21, which is shown in FIG. 5 as a linear advance 21 by way of example. The scan unit 15 can, however, carry out any desired advance movement. In particular, the advance 21 does not have to follow a linear trajectory but can travel along any desired scan path, for example a curved path of radius r.

Superposed, as it were, on the advance movement is a wobble movement of the laser beam 7, caused by the electro-optic deflector 13, in the form of a closed line pattern 31. This closed line pattern 31 is, however, moved over the raw material layer 5 as a result of the advance 21, so that a melt pool is correspondingly produced and the raw material is fused or sintered.

In the case of the example of section (a), the closed line pattern 31 is a circle. Section (b) shows a straight line as the closed line pattern 31, which straight line is moved up and down. Sections (c) and (d) each show an eight as the closed line pattern 31, which eights are, however, each moved along different axes of symmetry of the eight. The line patterns mentioned in the above examples are only examples and any desired other (repeating or even random) patterns can be used for the deflection by the electro-optic deflector 13.

It is described hereinbelow, with reference to FIG. 6, how, with the aid of the technique described herein (i.e. for example with the aid of the device of FIG. 1), a tracking error of the first deflection unit can be compensated for by suitable actuation of the second deflection unit. As already described in connection with FIG. 1, the first deflection unit comprises in an exemplary embodiment a scan unit 15 having one or more galvanometer mirrors, and the second deflection unit comprises an electro-optic deflector 13. More specifically, in an exemplary embodiment the first deflection unit comprises a scan unit 15 (or a galvanometer scanner) having two mirror components for laser beam deflection. These in turn have a mass and accordingly also a mass inertia, or a mass moment of inertia. The mechanically moved galvanometer mirrors accordingly require a certain amount of time to accelerate to the required speed following a corresponding control signal. This ultimately results in a tracking error, wherein tracking error is a term known in the field of laser technology and laser material processing and is a known problem. In brief, the tracking error has the result that the actual position of the laser beam lags behind the target position (specified by the actuation). Generally speaking, it can be said that the actual position of the laser beam differs from the target position of the laser beam owing to the tracking error.

The above-described problem of the tracking error can be compensated for at least partially by the introduction of suitable delay times, for example. Jump delay and mark delay are known measures to compensate for mechanical overshoot. This is effected by introducing delays and accordingly ensuring that work is no longer carried out in the overshoot region of scan unit.

Figure 6:
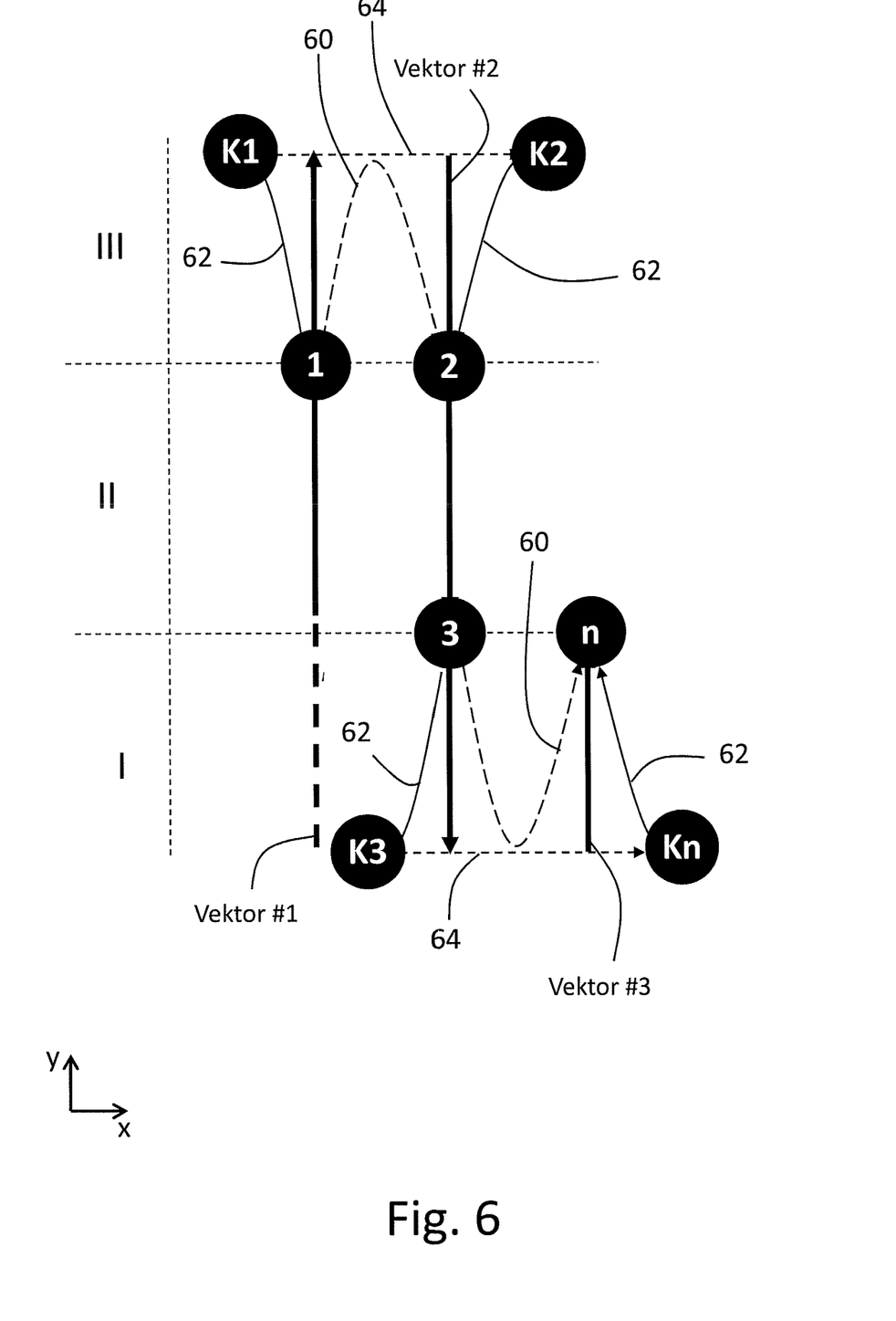
FIG. 6: is a schematic top view to show a method with which a tracking error of the first deflection unit can be compensated for by a compensating deflection of the second deflection unit.

FIG. 6 shows how the second deflection unit (in the present exemplary embodiment in the form of an electro-optic deflector 13) can be used to compensate for a tracking error of the first deflection unit (scan unit 15).

The thick lines and arrows in FIG. 6 (vector #1, vector #2 and vector #3) show the actual (corrected) scan trajectory, that is to say the path actually travelled by the laser on the raw material layer. The thin broken lines 60 describe jumping movements of the scan unit 15, which have a tracking error. The thin solid lines 62 describe compensating deflections of the electro-optic deflector 13. When the jumping movement 60 of the scan unit 15 is superposed and combined with the compensating deflection 62 of the electro-optic deflector 13, this results in the straight scan vectors which are shown in FIG. 6. The Roman numerals I, II and III which are shown in FIG. 6 describe different sub-regions of the scan sequence, which is described hereinbelow.

In sub-region I, the scan operation of vector #1 is started. The trajectory is described by the scan unit 15, wherein the electro-optic deflector 13 is not active. The thick line of vector #1 is shown broken in sub-region I, since this operation proceeds initially in this example.

Sub-region II is identical to sub-region I up to the point in time at which transfer point 1 (black circle "1" in FIG. 6) is reached. The definition of transfer point 1, both temporally and spatially, is given by the performance of the scan unit 15 (acceleration leads to specific delay times). At this point, the scan unit 15 initiates a movement in the direction of vector #2. This initiated lurching movement 60 of the scan unit 15 is compensated for by a corresponding countermovement or compensating deflection 62 of the electro-optic deflector 13.

In sub-region III, the scan trajectory is described by the movement initiated in sub-region II, which results from the combination of the deflections of the scan unit 15 and of the electro-optic deflector 13. This results in the straight linear portions of vectors #1 and #2 shown in FIG. 6.

Reaching the end point of vector #1 means for the electro-optic deflector 13 that the end point K1 of its compensating movement 62 is reached. From the end point K1, the electro-optic deflector 13 carries out a jumping movement 64 at maximum acceleration or speed in the direction of point K2. K2 accordingly defines the starting point of a second compensating movement 62 of the electro-optic deflector 13. Starting from K2, the electro-optic deflector 13 begins a new compensating movement 62 in the opposite direction to the preceding compensating movement 62, as far as transfer point 2 (black circle "2" in FIG. 6). The definition of transfer point 2, both temporally and spatially, is given by the performance of the scan unit 15 (acceleration leads to specific delay times).

Reaching the end point of vector #1 means for the scan unit 15 in the best case that the vertex of its jumping movement 60 has been reached.

Vector #2 is then travelled in the opposite direction to vector #1, wherein at the transfer from vector #2 to vector #3 substantially the same process takes place as at the transfer from vector #1 to vector #2. In other words, the scan unit 15 again performs a jumping movement 60, which is compensated for by corresponding compensating deflections 62 of the electro-optic deflector 13, so that the scan trajectory of the vectors runs substantially—as shown in FIG. 6—along a straight line and parallel to one another.

The procedure described above in connection with FIG. 6 is merely an example of how a tracking error of the scan unit 15 can be compensated for by a corresponding compensating deflection of the electro-optic deflector 13. The procedure described above can readily be applied to other situations in which there is a tracking error, so that this tracking error can be compensated for by a suitable compensating deflection of the electro-optic deflector 13. The method described above, or other comparable methods, for compensating for a tracking error have the advantage that the above-mentioned delays, which are known from the prior art, can be omitted or reduced, since the compensating deflection 62 by the electro-optic deflector 13 is carried out at the same time as the jumping movement 60 of the scan unit 15.

By means of the methods described above, which are made possible by a combination of the scan unit 15 and the electro-optic deflector 13, a flexibility of possible irradiation patterns or irradiation sequences is improved, and it is possible overall to achieve an increase in the process productivity while maintaining the quality of the workpiece 3.

Owing to the methods described above, it is appropriate to adapt or optimize control data. For example, each layer of a workpiece to be produced can be analyzed with the aid of the control device and corresponding control data can be produced for each layer. This process results in control data for an optimized building process of the workpiece, wherein time and quality aspects are taken into consideration and optimized. In particular, control data can be optimized in dependence on a component shape (for example given by CAD data) of the workpiece to be produced. Further details of the optimization of control data, which can also be used in connection with the present application, can be found in PCT/EP2018/051422.

The above methods can be used, for example, in order first to analyze each layer of the workpiece to be produced with the aid of the control device of the device for producing the workpiece. The potential for possible optimizations can thereby already be estimated. The control device then produces control data for the actuation of the scan unit 15 and the electro-optic deflector 13, wherein these control data make possible optimized consolidation of the respective layer of the workpiece. More specifically, the control data can be optimized in terms of the required outlay in terms of time and/or in terms of the required attention to detail. An inner "core" of the workpiece, for example, can thereby be consolidated more quickly, whereby a greater attention to detail is ensured in the edge region of the workpiece, for example by effecting smaller movements of the laser in this region.

Although the above exemplary embodiments use a scan unit 15 having movable mirrors and an electro-optical deflector 13, it is possible as an alternative to use a different first deflection unit instead of the scan unit 15 and/or to use a different second deflection unit instead of the electro-optic deflector 13. The sole relevant factor thereby is that the second deflection unit makes possible a higher acceleration of the position of the laser beam than the first deflection unit. An example of an alternative second deflection unit comprises, for example, at least one acousto-optic deflector. Furthermore, a scan unit having movable mirrors (for example galvanometer mirrors) can be used, for example, both for the first deflection unit and for the second deflection unit, wherein the mirrors of the second deflection unit make possible a movement or deflection of the laser beam with a higher acceleration than the mirrors of the first deflection unit.

Furthermore, as an alternative to the embodiments described above having a first deflection unit and a second deflection unit (i.e. for example having a scan unit 15 as the first deflection unit and an electro-optical deflector 13 as the second deflection unit), the first deflection unit can be omitted and all the deflections of the laser beam (within the plane of the raw material powder) can be carried out by the second deflection unit. In other words, methods and devices are conceivable which comprise only an electro-optic deflector as the deflection unit (and no scan unit having galvanometer mirrors), wherein the laser beam is deflected only by the electro-optic deflector. The scanning methods described above (in particular the methods of the exemplary embodiments) can in this case be carried out exclusively with the electro-optic deflector.

The invention claimed is:

1. A method for producing a three-dimensional workpiece, comprising:
   irradiating a raw material layer with a laser beam, wherein a melt pool is produced at a point at which the laser beam strikes the raw material layer,
   changing a position of the laser beam on the raw material layer with the aid of a first deflection unit, and
   changing the position of the laser beam on the raw material layer with the aid of a second deflection unit, wherein the second deflection unit is adapted to deflect the position of the laser beam with a greater acceleration than a maximum possible acceleration of a deflection by the first deflection unit, and wherein the method further comprises:
   producing at least a first melt pool and a second melt pool, wherein the laser beam is moved to and from between the first melt pool and the second melt pool by the change of position with the aid of the second deflection unit, wherein the first melt pool and the second melt pool are maintained temporally continuously and are moved over the raw material layer by the change of position with the aid of the first deflection unit, and wherein the laser beam, by the change of position with the aid of the second deflection unit with an acceleration which is greater by a factor of more than 10 than that of a movement of the first melt pool and of the second melt pool by the first deflection unit, is moved to and from between the first and the second melt pool in such a manner that the laser beam does not produce a melt pool between the first melt pool and the second melt pool.

2. The method as claimed in claim 1, wherein the change of position by the first deflection unit is carried out with a lower acceleration and/or with a lower speed than the change of position by the second deflection unit.

3. The method as claimed in claim 1, wherein the first deflection unit comprises a scan unit which comprises at least one movable mirror, and wherein the second deflection unit comprises an electro-optic deflector.

4. The method as claimed in claim 1, wherein the change of position with the aid of the first deflection unit effects an advance of the laser beam in a first direction, and wherein the change of position with the aid of the second deflection unit takes place in a direction which is different from the first direction.

* * * * *